United States Patent [19]

Yamamoto

[11] Patent Number: 5,459,539
[45] Date of Patent: Oct. 17, 1995

[54] OPTICAL PROJECTION APPARATUS

[75] Inventor: Mitsuo Yamamoto, Sagamihara, Japan

[73] Assignee: U. S. Philips Corporation, New York, N.Y.

[21] Appl. No.: 161,957

[22] Filed: Dec. 2, 1993

[30]  Foreign Application Priority Data

Dec. 2, 1992 [JP] Japan .................................. 4-088542 U
Dec. 2, 1992 [JP] Japan ..................................... 4-345112

[51] Int. Cl.⁶ .................................................. G03B 21/00
[52] U.S. Cl. .............................. 353/119; 353/101
[58] Field of Search ............................. 353/119, 101, 353/98, 1, 2, 43, 100, 120, DIG. 5

[56]  References Cited

U.S. PATENT DOCUMENTS 4,735,499  4/1988  Kiuchi ......................................... 353/120
4,824,210  4/1989  Shimazaki ................................. 353/119

FOREIGN PATENT DOCUMENTS 0421628  4/1991  European Pat. Off. .

*Primary Examiner*—William A. Cuchlinski, Jr.
*Assistant Examiner*—William C. Dowling
*Attorney, Agent, or Firm*—Michael J. Balconi-Lamica

[57]  ABSTRACT

An optical projection apparatus comprising, in this order, a radiation source (30), a liquid crystal display panel (33) and a projection lens (35). By arranging the axis of a projection lens portion (21) at an angle of substantially 90° with the axis (L) of the remaining portion (29a), a compact apparatus is obtained, the projection axis of which can easily be set, by rotating the projection lens portion around an axis is parallel to the remaining portion axis.

16 Claims, 2 Drawing Sheets

OPTICAL PROJECTION APPARATUS

BACKGROUND OF THE INVENTION

The present invention relates to an optical projection apparatus comprising, in this order, a light source, a liquid crystal display panel and a projection lens for projecting an image generated by said panel onto a projection screen.

Such apparatus is widely known, and FIG. 1 shows an embodiment of such apparatus. In a rectangular housing 1 are provided from the rear end to the front end, and along a projection axis 14 a lamp 6, a filter 5, a converging lens 4, a liquid crystal display panel 3 and a projection lens 2. The housing 1 is provided with air inlet holes 7 and 8 for inhaling coolant ambient air and with a fan 9 for exhausting this air. The directions of the air streams are indicated by arrows 12.

The projector housing is placed so as to have an inclination with respect to a surface 10 such as a table or the like by means of a stand 11 drawn by a dot line. Details of the stand 11 are not shown, but the upper end of the stand 11 is shifted in upward and downward direction, indicated by an arrow 13, by hand adjustment, which is a well-known technology.

It is difficult to make the conventional projector compact due to its construction. Furthermore a complicated angle adjustment mechanism for adjusting the inclination of the body is required in order to project an image onto a screen.

SUMMARY OF THE INVENTION

The purpose of the present invention is to solve these problems and to provide a compact projection apparatus of which the projection axis inclination angle can be set easily and accurately. This projection apparatus is characterized in that it comprises a first holder, for holding the projection lens and having a first optical axis, a second, tubular, holder for holding other components and having a second optical axis, the first optical axis being substantially perpendicular to the second optical axis, and a support for the second holder, and in that the first holder is rotatable around an axis parallel to the second optical axis.

In this projection apparatus the light path is folded so that the length of the apparatus is decreased, and the projection axis inclination can be set easily by manually rotating the first holder.

This apparatus may be further characterized in that the first holder comprises a reflector arranged at an angle of substantially 45° with the first optical axis and the second optical axis.

By the 45° reflector folding of the light path is achieved in the most simple way.

A preferred embodiment of the apparatus according to the present invention is characterized in that the first holder is fixed to the second holder and in that the latter is rotatably arranged in a stationary case which is fixed to the support.

As the second holder rotates with the first holder, the orientation of the liquid crystal display panel with respect to the projection lens is kept constant.

A constructively preferred embodiment of the apparatus is characterized in that the second holder is provided with bearings supported in the stationary case and in that an elastic member is provided between an end portion of the second holder and the end of a neighbouring bearing.

An embodiment of the projection apparatus wherein the liquid crystal display panel is arranged in a supporting member, may be further characterized in that said member is provided on its surface with a plurality of radially arranged fins which surround the liquid crystal display panel.

BRIEF DESCRIPTION OF THE DRAWING

The invention will now be described more in detail by referring to the accompanying drawings, in which.

DETAILED DESCRIPTION OF THE PREFERRED EMBODIMENTS

Figure 1:
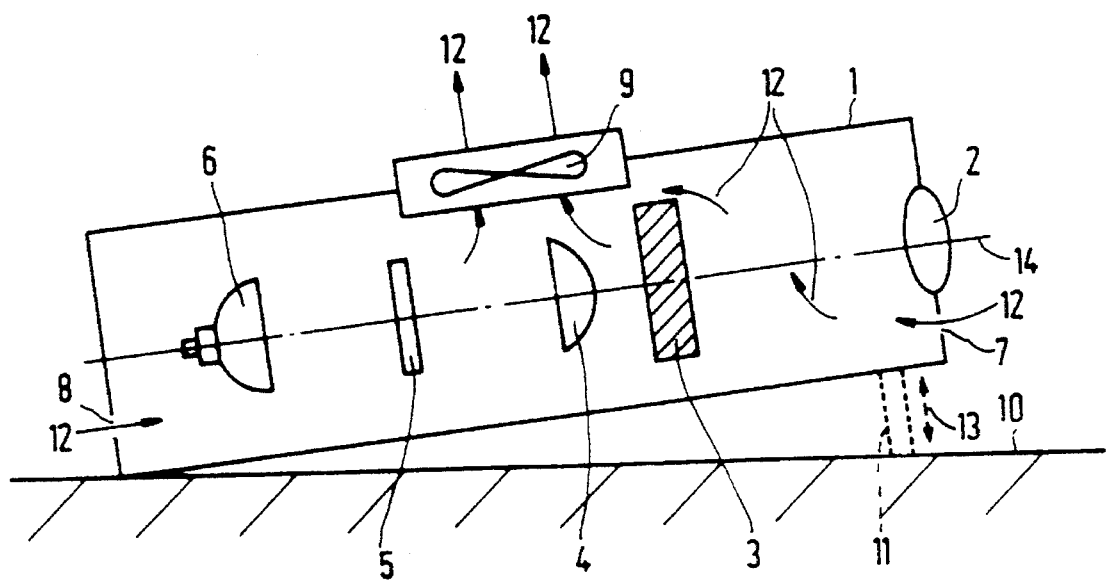
FIG. 1 shows a conventional projection apparatus.
Figure 2:
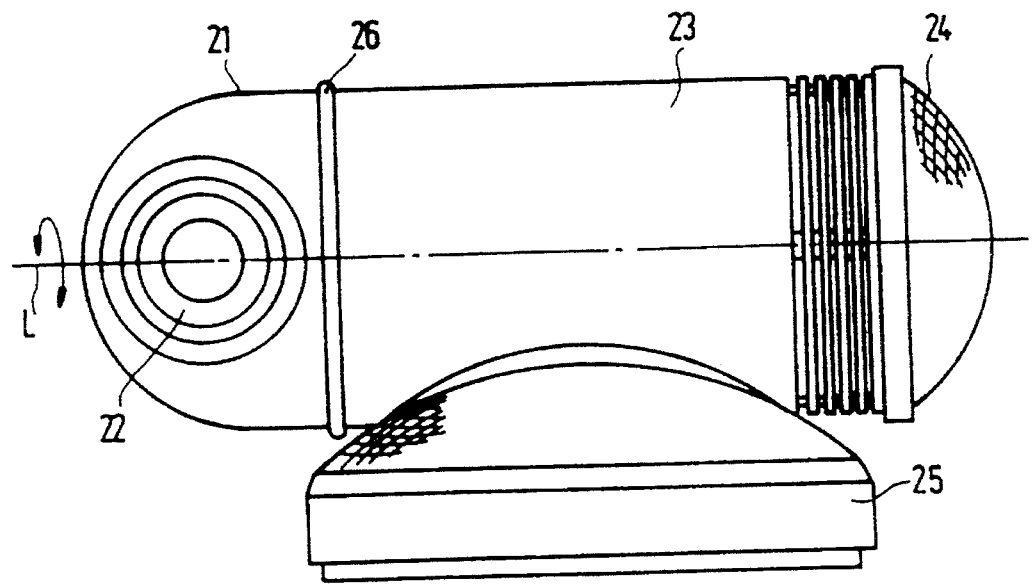
FIG. 2 shows a view of the apparatus according to the invention.

In FIG. 2 numeral 21 denotes the first holder which is arranged rotatably and comprises a projection lens 22. Numeral 23 denotes a tubular case which comprises other members of the optical projection system. The axis L of case 23 coincides with the rotation axis of holder 21. The case 23 may have a speaker part 24 at its end remote from the first holder 21. Numeral 25 denotes a support for the case 23. The support 25 may incorporate terminals of an electronic system, an electronic circuit, a fan, an adjustment member and the like. Numeral 26 denotes a coupling member which couples the first holder 21 rotatably to the case 23. This projection apparatus can be very compact.

Figure 3:
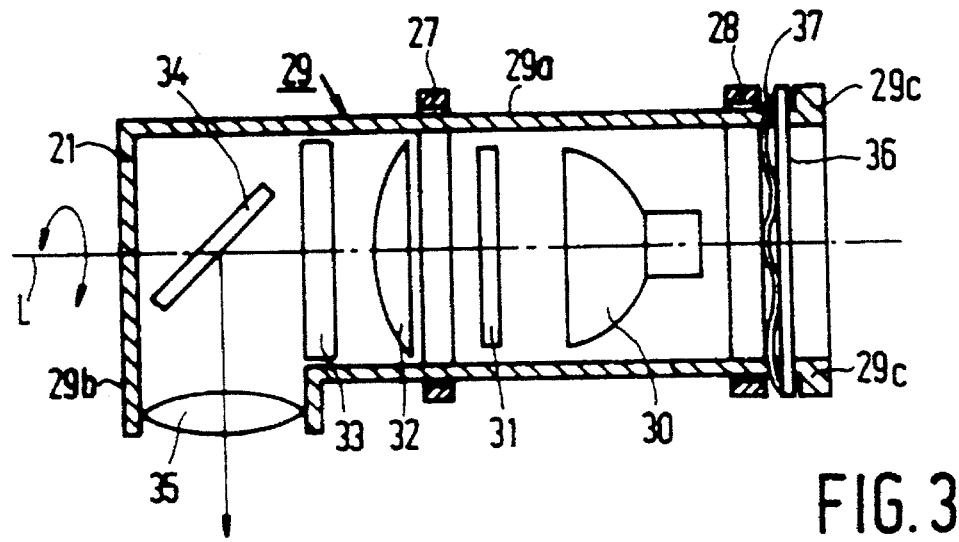
FIG. 3 shows an embodiment of this apparatus in cross-section.

FIG. 3 shows, in cross-section an embodiment of the projection apparatus in which the holder 21 of FIG. 2 forms a part 29b of an L-shaped holder 29, which has a second tubular holder part 29a. In the latter a lamp 30, a filter 31, a converging lens 32 and a liquid crystal display panel 33 are accommodated. In the holder 29b a reflector 34 is arranged which reflects the optical axis L of the beam emanating from the holder 29a over 90° so that it coincides with the axis of the projection lens 35.

The tubular holder 29a is inserted between bearings 27 and 28 which are fitted in and fixed to the outer case 23 shown in FIG. 2. The holder 29 is fixed to the bearing 28 by means of a washer 36 and a ring shaped plate spring 37 between the rear end portion 29c of the holder and the rear side of bearing 28. The coupling part 26 comprises a similar spring construction which enables the holder 21 to be rotated by hand with respect to the outer case 23.

Although the design of the apparatus may be such that only the holder 21 with the projection lens 35 and the reflector 34 is rotated to set the projection axis angle, it is preferred that the whole optical system, except the radiation source 30, is rotatable. The display panel 33 may also be accommodated in the holder 21.

Figure 4:
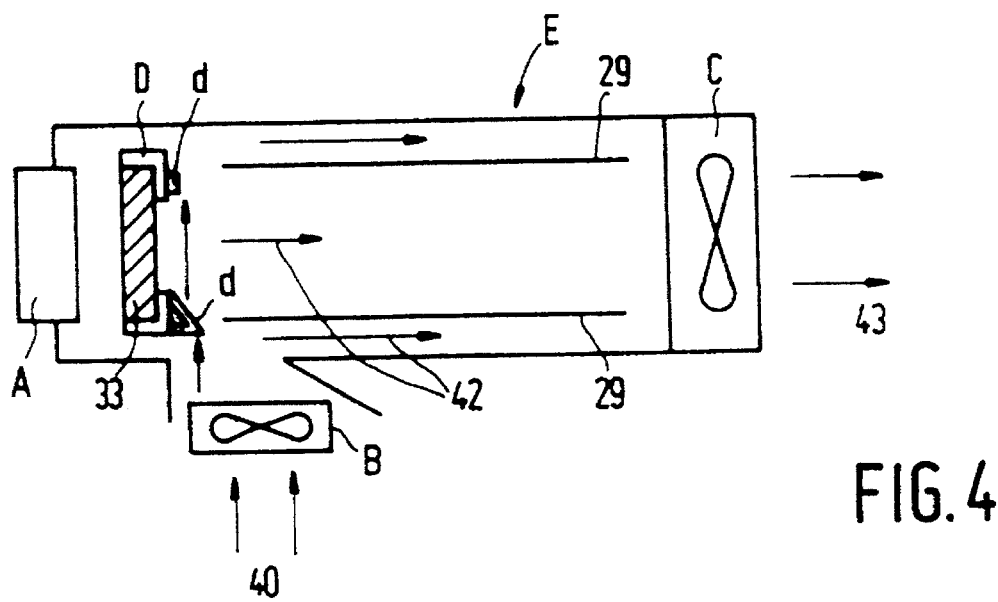
FIG. 4 illustrates how cooling is performed in this apparatus.
Figure 5:
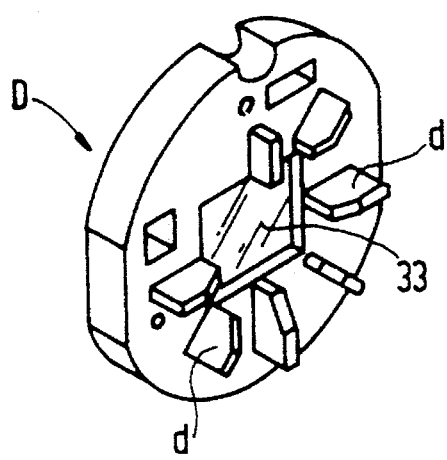
FIG. 5 shows a liquid crystal panel supporting member for use in this apparatus.

In order to ensure that in the case of a rotatable display panel this panel is efficiently cooled at any angle position of the panel, according to the invention special cooling means are provided as illustrated in FIGS. 4 and 5. FIG. 4 shows the cooling principle and FIG. 5 a perspective view of a heat radiating supporting member D for the display panel. In these figures A denotes a part containing the projection lens, the reflecting mirror and the like therein, B denotes a fan provided in the support member 25, C denotes another fan provided at the other end of the projector for example together with the speaker part 24 and D denotes a liquid-crystal-display-panel heat radiation supporting member arranged upwardly of the fan B. The supporting member carries the liquid crystal panel 33 therein and has a plurality of tapered fins d at its surface as clearly shown in FIG. 5.

Numeral 29 denotes a tube or the like and is integrally rotatable with A and D. E denotes an outer case containing the tubular holder 29a, the holder 21 and the like therein.

With the above-described construction, a cooling operation according to the invention is as follows. The open air 40 is inhaled by the fan B and then reaches the liquid-crystal-display-panel supporting member D arranged upwardly, whereby the liquid crystal panel of which temperature is rising is cooled. Then the open air flows in a direction indicated by arrows so as to cool the other internal members, and finally is exhausted (43) by means of the fan C. The liquid-crystal-display-panel supporting member D is rotatable over any desired angle as described before, and a plurality of tapered fins d are arranged radially with respect to the liquid crystal device panel 33 such that the cool air reaches the liquid crystal panel 33 efficiently at any angle about which the liquid-crystal-panel-radiation member D rotates.

An explanation on the operation of the liquid crystal display projector is omitted since it is well-known.

The above-described embodiments are only examples and various embodiments can be adopted within the scope of the invention without deviating from the invention.

According to the invention as described above, a compact projector having a good operationability can be obtained. In such a projector, a complicated projection axis angle adjustment mechanism needed in the conventional projector can be omitted, whereby a considerable cost reduction can be obtained.

Since the projector is compact, it can easily be carried to any place. Especially, if the compact projector is used in a car or in a plane in which space is very limited, projection can easily be performed by using a ceiling, wall or the like as a screen since the projection lens holding part is rotatable.

Furthermore, according to the invention, cooling of the liquid crystal device panel can be performed efficiently only by providing a plurality of fins arranged radially on the panel supporting member in compliance with the rotation construction according to the invention, without having a complicated construction like before.

I claim:

1. An optical projection apparatus having in this order, a light source, a display panel and a projection lens for projecting an image generated by said panel onto a projection screen, wherein the improvement comprises a first holder, for holding the projection lens and having a first optical axis, a second, tubular, holder for holding other components and having a second optical axis, the first optical axis being substantially perpendicular to the second optical axis, and a support for the second holder, and in that the first holder is rotatable around an axis parallel to the second optical axis so that the inclination of the projection axis can be changed with respect to the projection screen, wherein the first holder is fixed to the second holder and in that the latter is rotatably arranged in a stationary case which is fixed to the support.

2. An optical projection apparatus as claimed in claim 1, wherein the first holder includes a reflector arranged at an angle of substantially 45° with the first optical axis and the second optical axis.

3. An optical projection apparatus as claimed in claim 1, wherein the second holder is provided with bearings supported in the stationary case and in that an elastic member is provided between an end portion of the second holder and the end of a neighboring bearing.

4. An optical projection apparatus as claimed in claim 1, wherein the display panel is rotatable with the first holder.

5. An optical projection apparatus as claimed in claim 1, wherein the display panel is a liquid crystal display panel.

6. An optical projection apparatus having in this order, a light source, a display panel and a projection lens for projecting an image generated by said panel onto a first holder, for holding the projection lens and having a first optical axis, a second, tubular, holder for holding other components and having a second optical axis, the first optical axis being substantially perpendicular to the second optical axis, and a support for the second holder, and in that the first holder is rotatable around an axis parallel to the second optical axis so that the inclination of the projection axis can be changed with respect to the projection screen, wherein said display panel is rotatable with the first holder, said apparatus further having a supporting member for the display panel, wherein said member is provided on its surface with a plurality of radially arranged fins which surround the panel.

7. An optical projection apparatus as claimed in claim 6, wherein the display panel is a liquid crystal display panel.

8. An optical projection apparatus as claimed in claim 6, wherein the first holder includes a reflector arranged at an angle of substantially 45° with the first optical axis and the second optical axis.

9. An optical projection apparatus comprising:

a light source;

a display panel;

a projection lens for projecting an image generated by said display panel onto a projection screen, said projection lens being mounted within a first holder having a first optical axis;

a second holder for mounting other components of said projection apparatus and having a second optical axis, the optical axis of said second holder being perpendicular to said first optical axis and generally parallel to the surface on which said apparatus is to be placed; and a support for said second holder, said first holder being rotatable about an axis parallel to the second optical axis so that the inclination of projection axis can be altered with respect to the projection screen, wherein the first holder is fixed to the second holder and in that the second holder is rotatably arranged in a stationary case which is fixed to the support.

10. An optical projection apparatus as claimed in claim 9, wherein the first holder includes a reflector arranged at an angle of substantially 45° with the first optical axis and the second optical axis.

11. An optical projection apparatus as claimed in claim 9, wherein the second holder is provided with bearings supported in the stationary case and in that an elastic member is provided between an end portion of the second holder and the end of a neighboring bearing.

12. An optical projection apparatus as claimed in claim 9, wherein the display panel is rotatable with the first holder.

13. An optical projection apparatus as claimed in claim 9, wherein the display panel is a liquid crystal display panel.

14. An optical projection apparatus comprising:

a light source;

a display panel;

a projection lens for projecting an image generated by said display panel onto a projection screen, said projection lens being mounted within a first holder having a first optical axis;

a second holder for mounting other components of said projection apparatus and having a second optical axis, the optical axis of said second holder being perpendicular to said first optical axis and generally parallel to the surface on which said apparatus is to be placed; and a support for said second holder, said first holder being rotatable about an axis parallel to the second optical axis so that the inclination of projection axis can be altered with respect to the projection screen, wherein said display panel is rotatable with the first holder, said apparatus further including a supporting member for the display panel, wherein said member is provided on its surface with a plurality of radially arranged fins which surround the panel.

15. An optical projection apparatus as claimed in claim 14, wherein the display panel is a liquid crystal display panel.

16. An optical projection apparatus as claimed in claim 14, wherein the first holder includes a reflector arranged at an angle of substantially 45° with the first optical axis and the second optical axis.

* * * * *